(12) United States Patent
Yasuie et al.

(10) Patent No.: US 9,015,830 B2
(45) Date of Patent: Apr. 21, 2015

(54) VERIFICATION APPARATUS AND VERIFICATION METHOD

(75) Inventors: Takeshi Yasuie, Kawasaki (JP); Yuji Nomura, Kawasaki (JP); Taichi Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 13/357,720

(22) Filed: Jan. 25, 2012

(65) Prior Publication Data

US 2012/0240225 A1    Sep. 20, 2012

(30) Foreign Application Priority Data

Mar. 15, 2011 (JP) .................... 2011-057266

(51) Int. Cl.
*G06F 11/36* (2006.01)
*G06F 21/44* (2013.01)
*H04L 29/06* (2006.01)

(52) U.S. Cl.
CPC ............ *G06F 21/44* (2013.01); *H04L 63/0861* (2013.01); *G06F 2221/2129* (2013.01); *G06F 2221/2149* (2013.01); *G06F 2221/2119* (2013.01)

(58) Field of Classification Search
None
See application file for complete search history.

(56) References Cited

U.S. PATENT DOCUMENTS

| | | | |
|---|---|---|---|
| 6,560,723 B1 | 5/2003 | Matsui | |
| 7,031,895 B1 | 4/2006 | Takahashi et al. | |
| 7,639,627 B1* | 12/2009 | Ye et al. | 370/252 |
| 7,653,006 B1* | 1/2010 | Marino et al. | 370/252 |
| 2005/0141432 A1* | 6/2005 | Sirbu | 370/242 |
| 2008/0097995 A1* | 4/2008 | Dias et al. | 707/8 |
| 2011/0246971 A1* | 10/2011 | Chua et al. | 717/135 |
| 2012/0084605 A1* | 4/2012 | Shilon et al. | 714/33 |
| 2012/0158723 A1* | 6/2012 | Wu et al. | 707/737 |

FOREIGN PATENT DOCUMENTS

| | | |
|---|---|---|
| JP | 2000-196705 | 7/2000 |
| JP | 2001-044993 | 2/2001 |
| JP | 2001-195270 | 7/2001 |
| JP | 2010-81194 | 4/2010 |

OTHER PUBLICATIONS

Japanese Office Action dated Nov. 11, 2014 in corresponding Japanese Patent Application No. 2011-057266.

* cited by examiner

*Primary Examiner* — Kaveh Abrishamkar
*Assistant Examiner* — Adrian Stoica
(74) *Attorney, Agent, or Firm* — Staas & Halsey LLP

(57) ABSTRACT

A verification apparatus for verifying a verified apparatus corresponding to a first apparatus included in a plurality of information processing apparatuses includes a storage and a processor. The storage stores captured data acquired by capturing data transmitted and received among the plurality of information processing apparatuses. The processor receives first data transmitted from the verified apparatus. The first data is destined for a second apparatus included in the plurality of information processing apparatuses. The processor extracts, from the storage, second data transmitted from the second apparatus in response to third data transmitted from the first apparatus to the second apparatus. The third data corresponds to the first data. The processor transmits the extracted second data to the verified apparatus.

7 Claims, 14 Drawing Sheets

FIG. 3

| SEQUENTIAL NUMBER | SOURSE | DESTINATION | PACKET |
|---|---|---|---|
| 1 | CLIENT | AP | HTTP Req |
| 2 | AP | DB | SQL Req |
| 3 | DB | AP | SQL Res |
| 4 | AP | CLIENT | HTTP Res |
| ... | ... | ... | ... |

FIG. 4

| VERIFIED APPARATUS | SEQUENTIAL NUMBER | TRANSMITTED PACKET | RECEIVED PACKET |
|---|---|---|---|
| AP | 1 | HTTP Req | - |
| | 2 | - | SQL Req |
| | 3 | SQL Res | - |
| | 4 | - | HTTP Res |
| ... | ... | ... | ... |

FIG. 9

| SEQUENTIAL NUMBER | SOURCE | DESTINATION | PACKET |
|---|---|---|---|
| 1 | CLIENT | Web | HTTP Req |
| 2 | Web | AP | IIOP Req |
| 3 | AP | DB | SQL Req |
| 4 | DB | AP | SQL Res |
| 5 | AP | Web | IIOP Res |
| 6 | Web | CLIENT | HTTP Res |
| ... | ... | ... | ... |

VERIFICATION APPARATUS AND VERIFICATION METHOD

CROSS-REFERENCE TO RELATED APPLICATION

This application is based upon and claims the benefit of priority of the prior Japanese Patent Application No. 2011-057266 filed on Mar. 15, 2011, the entire contents of which are incorporated herein by reference.

FIELD

The embodiments discussed herein are related to a verification apparatus and a verification method.

BACKGROUND

In a system that includes a web server, a database (DB) server, a client apparatus and the like, update operations such as an operation of applying a patch, an operation of updating firmware and an operation of updating a virus definition are performed for each of the apparatuses. There is a concern whether or not operations of the apparatuses before the update operations are different from operations of the apparatuses after the update operations, or there is a concern whether or not functions of the apparatuses are degraded after the update operations or whether or not performance of the apparatuses is degraded after the update operations.

Traditionally, before the update operations are performed for an apparatus in a production environment that provides a service, a corresponding apparatus prepared for verification in a verification environment is verified in advance. For example, an electronic message recording apparatus has been disclosed, which transmits data at the same time intervals as time intervals between transmission of data to be transmitted and received between apparatuses and conducts a reproduction test for the occurrence of a failure. The electronic message recording apparatus transmits an electronic message for transmission and reception of data unrelated to verification at short time intervals at a high speed and efficiently performs a simulation.

Japanese Laid-open Patent Publication Nos. 2010-81194, 2001-44993 and 2001-195270 disclose related techniques.

The conventional techniques have a problem that it is not easy to perform advance verification.

For example, for a system in which a plurality of apparatuses interoperate with each other in multiple layers, it takes time and costs to prepare for verification since, for example, a system having the same configuration as a configuration of a production system may be prepared as a system configured to perform advance verification.

SUMMARY

According to an aspect of the present invention, provided is a verification apparatus for verifying a verified apparatus corresponding to a first apparatus included in a plurality of information processing apparatuses. The verification apparatus includes a storage and a processor. The storage stores captured data acquired by capturing data transmitted and received among the plurality of information processing apparatuses. The processor receives first data transmitted from the verified apparatus. The first data is destined for a second apparatus included in the plurality of information processing apparatuses. The processor extracts, from the storage, second data transmitted from the second apparatus in response to third data transmitted from the first apparatus to the second apparatus. The third data corresponds to the first data. The processor transmits the extracted second data to the verified apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a production captured data DB according to a second embodiment;

FIG. 4 is a diagram illustrating an example of information stored in a verification data DB;

FIG. 9 is a diagram illustrating an example of information stored in a production captured data DB according to a third embodiment;

DESCRIPTION OF EMBODIMENTS

Hereinafter, embodiments of a verification apparatus and a verification method will be discussed with reference to the accompanying drawings. However, embodiments are not limited to the discussed embodiments.

First Embodiment

Figure 1:
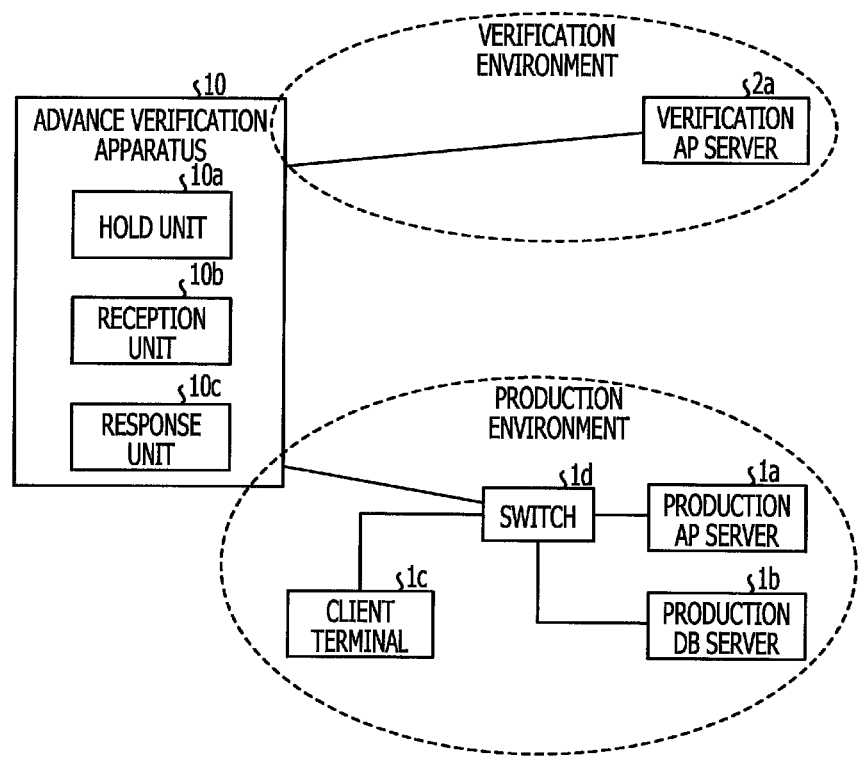
FIG. 1 is a diagram illustrating an example of an entire configuration of a system according to a first embodiment.

FIG. 1 is a diagram illustrating an example of the entire configuration of a system according to a first embodiment. As illustrated in FIG. 1, in the system, an advance verification apparatus 10 is connected to a production environment and a verification environment. The production environment is a system that provides various types of services such as a web service to a client. The verification environment is a system that is used to verify, before update operations such as an operation of applying a patch and an operation of upgrading a version, whether or not functions and performance of servers and the like that operate in the production environment are degraded after the update operations.

The production environment includes a production application (AP) server 1a, a production DB server 1b, a client terminal 1c and a switch 1d. The production environment is configured with a network that is different from a network included in the verification environment. The production AP server 1a is a server that receives a request from the client terminal 1c and performs a transaction with the production DB server 1b. The production AP server 1a may have a function as a web application server that accumulates HTML documents to provide a web service.

For example, the production AP server 1a executes an application corresponding to a request received from the client terminal 1c and transmits a request to the production DB server 1b. Then, the production AP server 1a receives, from the production DB server 1b, a response to the request and transmits the response to the client terminal 1c.

The production DB server 1b includes a database. The production DB server 1b performs update of the database and the like in accordance with the request received from the production AP server 1a and transmits, to the production AP server 1a, a result of updating the database and the like as the response to the request. As the database that is included in the production DB server 1b, any of various databases such as a relational database, an object database and a key value store (KVS) may be used.

The client terminal 1c is a computer that accesses the production AP server 1a using a web browser or the like and uses services. For example, the client terminal 1c updates the database included in the production DB server 1b through the production AP server 1a.

The switch 1d is connected to the production AP server 1a, the production DB server 1b and the client terminal 1c through ports. The switch 1d is a data relay apparatus that switches communications among the production AP server 1a, the production DB server 1b and the client terminal 1c. For example, a switching hub, a router, a tap or the like may be used as the switch 1d. The switch 1d performs port mirroring, that is, the switch 1d transfers data received from the production AP server 1a, the production DB server 1b or the client terminal 1c to the advance verification apparatus 10.

The verification environment is configured with a network that is different from the network included in the production environment. The verification environment is an environment that connects a server (hereinafter, referred to as a verified server) to be verified to the advance verification apparatus 10. The verified server has the same configuration as a configuration of a server operating in the production environment or a server to be newly connected to the production environment. A time to verify the servers may be the time when the performance and the like after the aforementioned update operations is confirmed, the time when a server is installed, or the like. For example, such a case is also included that, the aforementioned production environment is operated by a company and only the production AP server 1a is replaced with a cloud environment provided by a system integrator or the like. In this case, the advance verification apparatus 10 verifies a verification AP server 2a that has the same functions as functions of the production AP server 1a.

Hereinafter, the production AP server 1a is to be verified as an example. Thus, it is assumed that the verification environment has a verification AP server 2a. The verification AP server 2a is a verified server and has the same functions as functions of the production AP server 1a. The verification AP server 2a is connected to the advance verification apparatus 10. An internet protocol (IP) address of the advance verification apparatus 10 is set in the verification AP server 2a as an address of apparatuses not to be verified but to directly communicate with the verification AP server 2a, that is, the production DB server 1b and the client terminal 1c.

The verification AP server 2a performs the same transaction as a transaction actually performed by the production AP server 1a and transmits data to the advance verification apparatus 10. In addition, when the verification AP server 2a has received a packet from the advance verification apparatus 10, the verification AP server 2a transmits, to the advance verification apparatus 10, response data that corresponds to the received packet.

The advance verification apparatus 10 includes a hold unit 10a, a reception unit 10b and a response unit 10c. The advance verification apparatus 10 is a server that uses the same transaction as a transaction actually performed in the production environment to verify an operation and performance of the verification AP server 2a.

The hold unit 10a holds data captured in the production environment including a plurality of apparatuses. For example, the hold unit 10a holds data received through port mirroring by the switch 1d.

The reception unit 10b receives data transmitted from the verification AP server 2a to any of the other apparatuses in the production environment. The response unit 10c extracts data transmitted in the production environment from among the captured data held by the hold unit 10a, as a response to the data received by the reception unit 10b, and transmits the extracted data to the verification AP server 2a.

The advance verification apparatus 10 stores data generated by a transaction performed in the production environment and a sequence of transmitting and receiving the data to perform operations of the servers (other than the verified server) in a pseudo manner. Thus, only the verified server is prepared instead of preparing the same environment as the production environment to verify the server in advance. Therefore, the advance verification may be easily performed.

Second Embodiment

Next, a functional configuration and the like of the advance verification apparatus 10 will be discussed in a second embodiment with reference to FIG. 2. The production AP server 1a and the verification AP server 2a each have the same functions as a general AP server. The production DB server 1b has the same functions as a general DB server. The client terminal 1c has the same functions as a general computer. Thus, detailed discussions of the production AP server 1a, the production DB server 1b and the client terminal 1c will be omitted. The functional configuration of the advance verification apparatus 10, the flows of processes, effects and the like will be discussed below.

Functional Configuration of Advance Verification Apparatus

Figure 2:
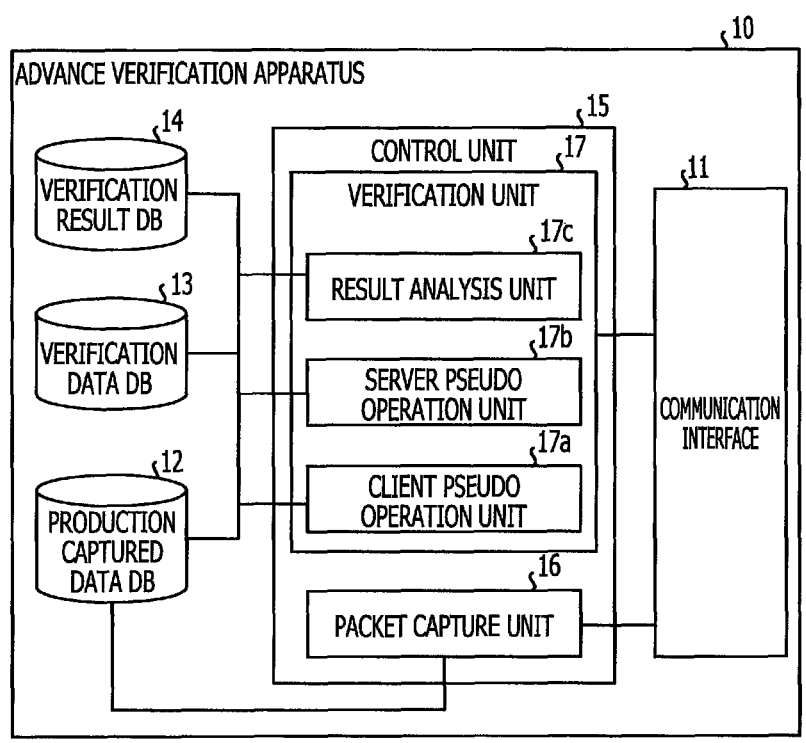
FIG. 2 is a block diagram illustrating a functional configuration of an advance verification apparatus according to a second embodiment.

FIG. 2 is a block diagram illustrating a functional configuration of the advance verification apparatus 10 according to the second embodiment. As illustrated in FIG. 2, the advance verification apparatus 10 includes a communication interface 11, a production captured data DB 12, a verification data DB 13, a verification result DB 14 and a control unit 15.

The communication interface 11 has one or more ports and controls communication between the advance verification apparatus 10 and the verification AP server 2a. In addition, the communication interface 11 controls communication between the advance verification apparatus 10 and the switch 1d.

An IP address to be used in the production environment and IP addresses for apparatuses other than an apparatus (hereinafter, referred to as a verified apparatus) to be verified are assigned to the ports of the communication interface 11. In the example illustrated in FIG. 1, an IP address used in the production environment is assigned to a first port of the communication interface 11; an IP address used as an address of the production DB server 1b is assigned to a second port of the communication interface 11; and an IP address used as an address of the client terminal 1c is assigned to a third port of the communication interface 11.

The production captured data DB 12 holds data of a packet captured in the production environment including the plurality of apparatuses. Specifically, the production captured data DB 12 stores information of a packet generated by a transaction performed in the production environment. Data that has been captured by a packet capture unit 16 (discussed later) for a certain time period such as a single day or a single week is stored in the production captured data DB 12.

FIG. 3 is a diagram illustrating an example of the information stored in the production captured data DB 12 according to the second embodiment. As illustrated in FIG. 3, the production captured data DB 12 stores information regarding a "sequential number", a "source", a "destination" and a "packet", in association with one another.

The "sequential number" indicates the order that an interested packet is captured. The "source" indicates an apparatus that has transmitted the captured packet. The "destination" indicates an apparatus to which the captured packet has been transmitted. The "packet" indicates information of the captured packet. The production captured data DB 12 may store the captured packet itself in association with the aforementioned information.

In the example illustrated in FIG. 3, the information stored in the production captured data DB 12 indicates that an HTTP Req transmitted from the client terminal is to the production AP server 1a is first captured by the packet capture unit 16; an SQL Req transmitted from the production AP server 1a to the production DB server 1b is secondly captured; an SQL Res transmitted from the production DB server 1b to the production AP server 1a is thirdly captured; and an HTTP Res transmitted from the production AP server 1a to the client terminal 1c is fourthly captured. In this specification, "Req" is an abbreviation of the word "request", and "Res" is an abbreviation of the word "response".

The verification data DB 13 stores verification data that is obtained by verification performed by a verification unit 17 (discussed later). Specifically, the verification data DB 13 stores data of packets transmitted and received in the verification environment and captured by the verification unit 17. The verification unit 17 stores the verification data in the verification data DB 13. FIG. 4 is a diagram illustrating an example of information stored in the verification data DB 13. As illustrated in FIG. 4, the verification data DB 13 stores information regarding a "verified apparatus", a "sequential number", a "transmitted packet" and a "received packet".

The "verified apparatus" indicates the number, IP address or the like of the verified apparatus. The "sequential number" indicates the order that an interested packet is transmitted or received in the verification. The "transmitted packet" indicates information regarding the packet transmitted in the verification. The "received packet" indicates information regarding the packet received in the verification. In the example illustrated in FIG. 4, the information stored in the verification data DB 13 indicates that, in the verification performed on the verification AP server 2a, an HTTP Req is first transmitted; an SQL Req is secondly received; an SQL Res is thirdly transmitted; and an HTTP Res is fourthly received.

The verification result DB 14 stores a verification result obtained by the verification unit 17. For example, the verification result DB 14 stores information regarding a "date and time", a "verified apparatus" and a "verification result", in association with one another. The "date and time" indicates a date and time when the apparatus has been verified. The "verified apparatus" indicates the verified apparatus. The "verification result" indicates the result of the verification, for example, whether the verified apparatus is normal or abnormal, or the like.

The control unit 15 includes the packet capture unit 16 and the verification unit 17. The packet capture unit 16 captures a packet. The verification unit 17 conducts a verification test. The control unit 15 may be an electronic circuit such as a central processing unit (CPU), an integrated circuit such as a field-programmable gate array (FPGA) or the like.

The packet capture unit 16 captures, through the switch 1d, a packet actually transmitted and received in the production environment and stores the captured packet in the production captured data DB 12. For example, it is assumed that the client terminal 1c accesses the production AP server 1a and the production AP server 1a executes an application and thereby accesses the database of the production DB server 1b.

In this case, the packet capture unit 16 first captures a packet indicating a request to process the database, which has been transmitted from the client terminal 1c to the production AP server 1a. Next, the packet capture unit 16 captures a packet indicating a DB request, which has been transmitted from the production AP server 1a to the production DB server 1b. Subsequently, the packet capture unit 16 captures a packet indicating a DB response which has been transmitted from the production DB server 1b to the production AP server 1a. Lastly, the packet capture unit 16 captures a packet indicating a response to the request to process the database, which has been transmitted from the production AP server 1a to the client terminal 1c.

Thus, the packet capture unit 16 captures the packets, which have been actually generated by the transaction performed in the production environment, in order of generating the packets, and stores data regarding the captured packets in the production captured data DB 12. The packet capture unit 16 may store the captured packets themselves in the production captured data DB 12.

The verification unit 17 includes a client pseudo operation unit 17a, a server pseudo operation unit 17b and a result analysis unit 17c, and verifies the verified apparatus by using these units. When the captured data held by the production captured data DB 12 indicates a packet transmitted from the client terminal 1c to the production AP server 1a and when the packet has not been transmitted to the verified apparatus, the client pseudo operation unit 17a transmits the packet to the verified apparatus.

For example, when a system administrator or the like instructs to start verification, the client pseudo operation unit 17a references the production captured data DB 12. When verifying transmission of a packet from the client terminal 1c, the client pseudo operation unit 17a generates the interested packet on the basis of the production captured data DB 12 and transmits the generated packet to the verified apparatus.

For example, the client pseudo operation unit 17a references the production captured data DB 12 illustrated in FIG. 3 and finds that a process indicated by a sequential number "1" is transmission of a packet from the client terminal 1c to the production AP server 1a. As a result, the client pseudo operation unit 17a transmits an interested packet, that is, an HTTP Req, to the verification AP server 2a. That is, the client pseudo operation unit 17a performs the operation of the client terminal 1c in a pseudo manner in order to cause the verification AP server 2a to perform the same process as a process the transaction actually performed in the production environment. In addition, the client pseudo operation unit 17a assigns a sequential number "1" to the transmitted packet (HTTP Req), and stores the sequential number "1" and the information regarding the transmitted packet (HTTP Req) in the verification data DB 13 in association with each other.

The server pseudo operation unit 17b receives a packet transmitted from the verified apparatus to another apparatus. The server pseudo operation unit 17b extracts a packet, which has been transmitted from the another apparatus as a response to a packet transmitted from the production AP server is in the production environment, from among the captured data held by the production captured data DB 12, and transmits the extracted packet to the verified apparatus, as the response to the received packet.

For example, the verification AP server 2a receives an HTTP Req from the client pseudo operation unit 17a and performs the same transaction as the transaction actually performed in the production environment and the verification AP server 2a transmits an SQL Req to the production DB server 1b. The server pseudo operation unit 17b receives the SQL Req transmitted from the verification AP server 2a to the production DB server 1b. Subsequently, the server pseudo operation unit 17b references the production captured data DB 12 and finds that the production DB server 1b has transmitted an SQL Res to the production AP server 1a after the reception of the SQL Req. Then, the server pseudo operation unit 17b transmits the SQL Res to the verification AP server 2a.

In this manner, the advance verification apparatus 10 and the verification AP server 2a perform the same process as the transaction actually performed in the production environment. In other words, the advance verification apparatus 10 performs the operation of the production DB server 1b, which does not exist in the verification environment, in a pseudo manner. In addition, the server pseudo operation unit 17b assigns a sequential number "2" to the received packet (SQL Req) and stores the sequential number "2" and information regarding the received packet (SQL Req) in the verification data DB 13. Similarly, the server pseudo operation unit 17b assigns a sequential number "3" to the transmitted packet (SQL Res) and stores the sequential number "3" and information regarding the transmitted packet (SQL Res) in the verification data DB 13.

The result analysis unit 17c analyzes a result of the verification performed by the client pseudo operation unit 17a and the server pseudo operation unit 17b. The result analysis unit 17c displays the result of the verification on a display unit, transmits the result of the verification via an email to a terminal of an administrator, or the like.

For example, the result analysis unit 17c compares information stored in the production captured data DB 12 with information stored in the verification result DB 14. When the information stored in the production captured data DB 12 matches the information stored in the verification result DB 14, the result analysis unit 17c determines that the advance verification has been normally performed. On the other hand, when the information stored in the production captured data DB 12 does not match the information stored in the verification result DB 14, the result analysis unit 17c determines that the advance verification has been abnormally performed. In this case, the result analysis unit 17c extracts a mismatched part of the information and notifies the administrator of the extracted mismatched part, for example.

Specific Example of Advance Verification

Figure 5:
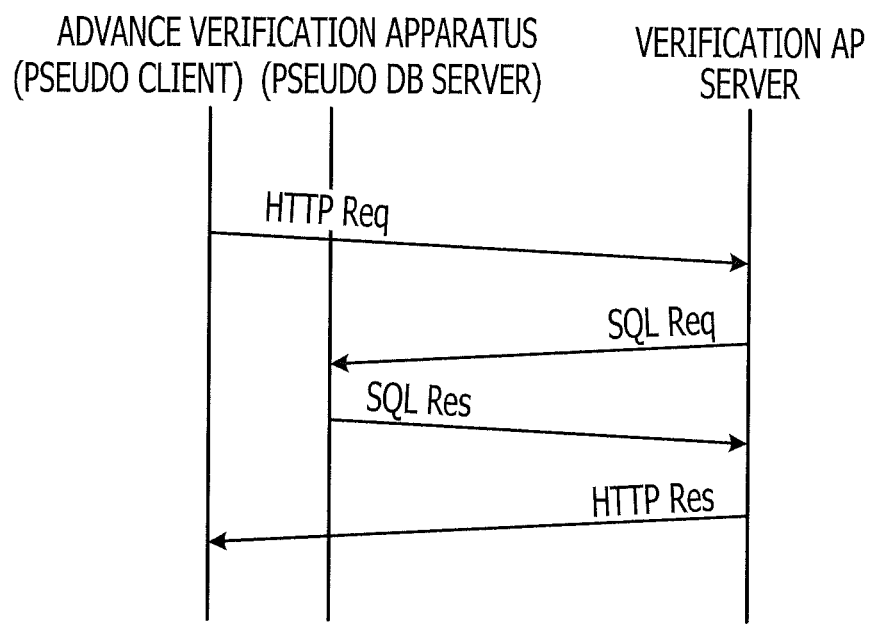
FIG. 5 is a diagram for explaining advance verification according to a second embodiment.

Next, the advance verification performed by the verification unit 17 of the advance verification apparatus 10 will be discussed. FIG. 5 is a diagram for explaining advance verification according to the second embodiment. The verification unit 17 starts advance verification when the system administrator instructs to start the verification, for example.

In the case illustrated in FIG. 5, the IP address used as the address of the production DB server 1b and the IP address used as the address of the client terminal 1c are set in the communication interface 11 of the advance verification apparatus 10. The IP address of the advance verification apparatus 10 is set in the verification AP server 2a as the addresses of apparatuses other than the verified apparatus, with which the verification AP server 2a directly communicates, that is, the production DB server 1b and the client terminal 1c.

The verification AP server 2a transmits, to the advance verification apparatus 10, a packet to be received by the production DB server 1b or the client terminal 1c. In addition, the verification AP server 2a receives, from the advance verification apparatus 10, a packet transmitted from the production DB server 1b or the client terminal 1c.

In this state, the client pseudo operation unit 17a performs an operation of the client terminal 1c in a pseudo manner on the basis of the information stored in the production captured data DB 12 so as to transmit an HTTP Req to the verification AP server 2a. Subsequently, when the server pseudo operation unit 17b has received an SQL Req from the verification AP server 2a, the server pseudo operation unit 17b performs an operation of the production DB server 1b in a pseudo manner on the basis of the information stored in the production captured data DB 12 so as to transmit an SQL Res to the verification AP server 2a.

Thereafter, when the verification AP server 2a transmits an HTTP Res, the server pseudo operation unit 17b performs an operation of the client terminal 1c in a pseudo manner on the basis of the information stored in the production captured data DB 12 so as to receive the HTTP Res. In this manner, the advance verification apparatus 10 performs the operations of the apparatuses other than the verified apparatus in a pseudo manner on the basis of the data of the packets captured in the production environment and thereby performs the advance verification.

Flows of Processes

Next, the flows of processes performed in the system illustrated in FIG. 1 will be discussed with reference to FIGS. 6 and 7. A client pseudo operation and a server pseudo operation, which are performed by the advance verification apparatus 10, will be discussed below.

Client Pseudo Operation

Figure 6:
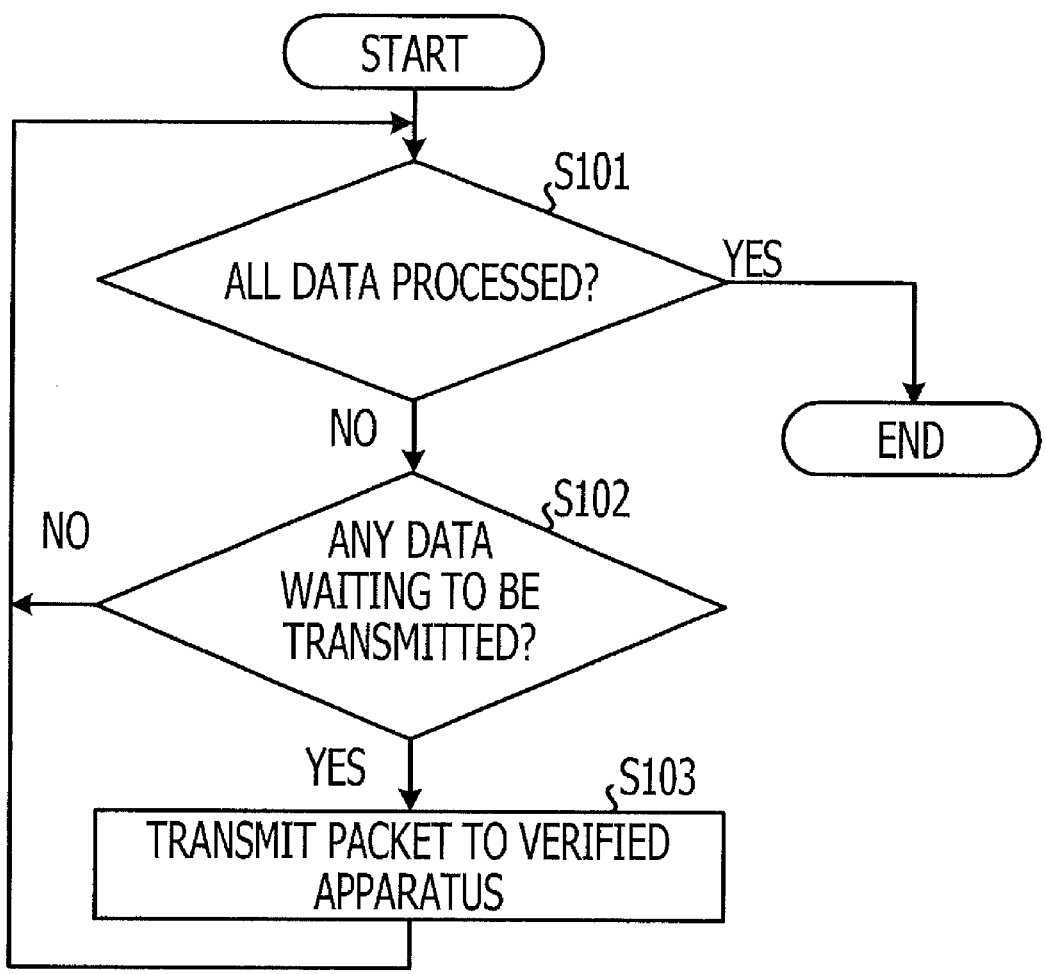
FIG. 6 is a flowchart of a client pseudo operation that is performed by an advance verification apparatus.

FIG. 6 is a flowchart of the client pseudo operation that is performed by the advance verification apparatus 10.

In S101, the client pseudo operation unit 17a references the production captured data DB 12 and determines whether or not all data stored in the production captured data DB 12 has been processed.

In S102, when the client pseudo operation unit 17a determines that any of the data has not been processed ("No" in S101), the client pseudo operation unit 17a determines whether or not any data waiting to be transmitted exists in the production captured data DB 12.

In S103, when the client pseudo operation unit 17a determines that the data waiting to be transmitted exists in the production captured data DB 12 ("Yes" in S102), the client pseudo operation unit 17a performs an operation of the client terminal 1c in a pseudo manner so as to transmit a packet to the verified apparatus. Specifically, the client pseudo operation unit 17a generates, in the verification environment, the same transaction as a transaction in the production environment.

When the client pseudo operation unit 17a transmits the packet to the verified apparatus and whereby all the data stored in the production captured data DB 12 has been processed ("Yes" in S101), the process illustrated in FIG. 6 is terminated. When the client pseudo operation unit 17a determines that the data waiting to be transmitted does not exist in the production captured data DB 12 ("No" in S102), the client pseudo operation unit 17a repeats S101 and later.

Server Pseudo Operation

Figure 7:
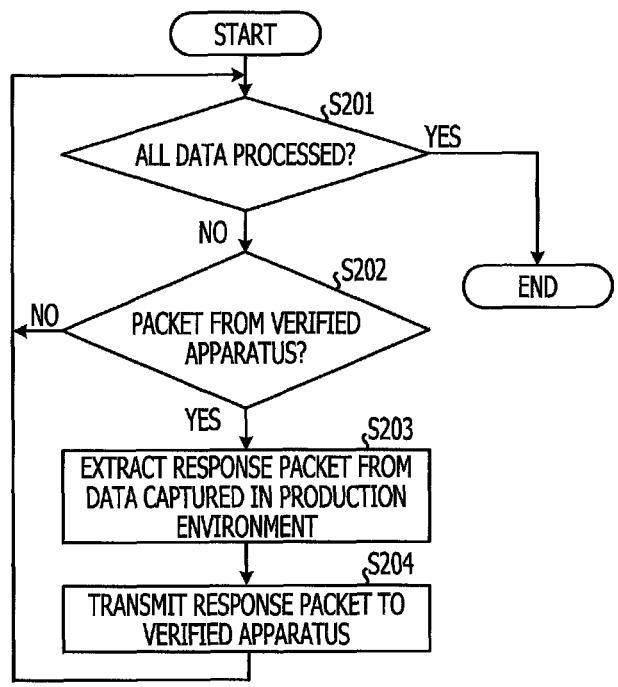
FIG. 7 is a flowchart of a server pseudo operation that is performed by an advance verification apparatus.

FIG. 7 is a flowchart of the server pseudo operation that is performed by the advance verification apparatus 10.

In S201, the server pseudo operation unit 17b references the production captured data DB 12 and determines whether or not all the data stored in the production captured data DB 12 has been processed.

In S202, when the server pseudo operation unit 17b determines that any of the data has not been processed ("No" in S201), the server pseudo operation unit 17b determines whether the server pseudo operation unit 17b has received a packet from the verified apparatus.

In S203, when the server pseudo operation unit 17b determines that the server pseudo operation unit 17b has received a packet from the verified apparatus ("Yes" in S202), the server pseudo operation unit 17b references the production captured data DB 12 and extracts, from the data captured in the production environment, a response packet to be transmitted as a response to the received packet.

In S204, the server pseudo operation unit 17b transmits the extracted response packet to the verified apparatus. Thereafter, the server pseudo operation unit 17b repeats S201 and later. Until the server pseudo operation unit 17b receives the packet from the verified apparatus, the server pseudo operation unit 17b repeats S201 and S202. In addition, when the server pseudo operation unit 17b determines that all the data has been processed ("Yes" in S201), the process illustrated in FIG. 7 is terminated.

Effects Obtained in Second Embodiment

When the verified apparatus is prepared in the verification environment without preparing an apparatus or the like that is not a verified apparatus, the advance verification apparatus 10 according to the second embodiment may verify the verified apparatus in advance. Thus, the cost and human efforts to build the environment for the advance verification may be reduced, compared with conventional techniques.

Traditionally, when a DB server is not a verified apparatus, a database within a verification environment is synchronized with a database within a production environment. However, the advance verification apparatus 10 may perform the advance verification without the synchronization. In addition, traditionally, when an external server exists, which operates in a system other than the production environment illustrated in FIG. 1 exists, a server and a logic that function as a stub to be used for verification is prepared as the external server for the verified server. On the other hand, the advance verification apparatus 10 may use the data captured in the production environment and easily verify each of the apparatuses in the production environment without implementing a chassis and an application as the external server.

Third Embodiment

In the example in the second embodiment, the verified server corresponds to a server included in a production environment that includes a production AP server and a production DB server 1b in two layers. However, the advance verification is not limited to this. For example, the advance verification apparatus 10 may verify a server corresponding to a server included in a production environment that includes servers in layers other than two layers. A third embodiment discusses an example in which a verified server corresponds to a web server in a production environment that includes the web server, an AP server and a DB server in three layers.

Entire Configuration

Figure 8:
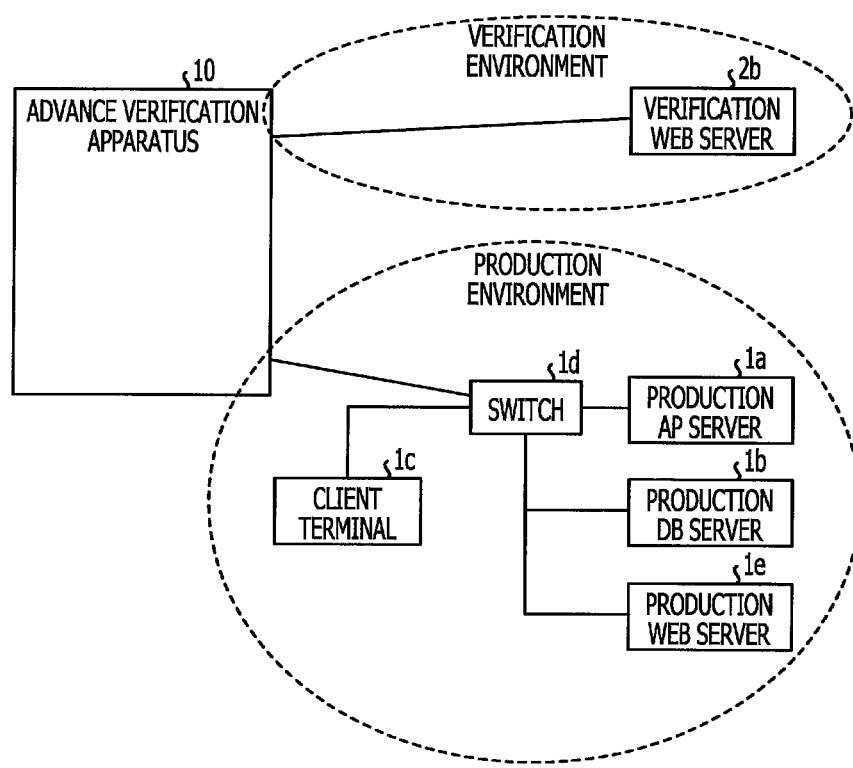
FIG. 8 is a diagram illustrating an example of an entire configuration of a system according to a third embodiment.

FIG. 8 is a diagram illustrating an example of the entire configuration of a system according to the third embodiment. In the example illustrated in FIG. 8, the advance verification apparatus 10 is connected to a verification environment and a production environment in a similar manner to the first embodiment. The IP address of the advance verification apparatus 10 is set in a verification web server 2b as the address of apparatuses not to be verified but to directly communicate with the verification web server 2b, that is, the production AP server 1a, the production DB server 1b and the client terminal 1c.

The production environment includes the production AP server 1a, the production DB server 1b, the client terminal 1c, the switch 1d and a production web server 1e. The production environment is configured with a network that is different from a network included in the verification environment. The production web server 1e accumulates information such as HTML documents and images. The production web server 1e transmits data of a web page including an image and the like in response to each of requests provided by the client terminal 1c and the production AP server 1a.

The verification environment is configured with a network that is different from the network included in the production environment. The verification environment is an environment that connects a verified server to the advance verification apparatus 10. The verified server has the same configuration as a configuration of a server operating in the production environment or of a server to be newly connected to the production environment. In the third embodiment, the verification web server 2b is connected, as a verified server, to the advance verification apparatus 10.

Similarly to the second embodiment, the advance verification apparatus 10 is a server that uses the same transaction as a transaction actually performed in the production environment to verify an operation and performance of the verification web server 2b. The advance verification apparatus 10 captures packets generated by a transaction performed by the apparatuses in the production environment. Then, the advance verification apparatus 10 uses data of the captured packets to verify the verification web server 2b.

Verification Process

The advance verification apparatus 10 illustrated in FIG. 8 has the same functional configuration as the functional configuration illustrated in FIG. 2. However, the apparatuses in the production environment according to the third embodiment are not exactly the same as the apparatuses in the production environment according to the second embodiment. Thus, the contents of information stored in the production captured data DB 12 according to the third embodiment are not exactly the same as the contents of the information stored in the production captured data DB 12 according to the second embodiment. FIG. 9 is a diagram illustrating an example of the information stored in the production captured data DB 12 according to the third embodiment. As illustrated in FIG. 9, the production captured data DB 12 according to the third embodiment stores information regarding a "sequential number", a "source", a "destination" and a "packet", in association with one another. Each information stored in the production captured data DB 12 according to the third embodiment is similar to the information stored in the production captured data DB 12 according to the second embodiment, and a detailed discussion thereof will be omitted.

The advance verification apparatus 10 according to the third embodiment captures a packet transmitted by the production web server 1e. Thus, the captured data stored in the production captured data DB 12 according to the third embodiment is not exactly the same as the captured data stored in the production captured data DB 12 according to the second embodiment. This feature will be discussed below in detail with reference to FIG. 9. In the example illustrated in FIG. 9, the information stored in the production captured data DB 12 indicates that an HTTP Req transmitted from the client terminal 1c to the production web server 1e is first captured by the packet capture unit 16 and an Internet Inter-ORB Protocol (IIOP) Req transmitted from the production web server 1e to the production AP server 1a is secondly captured.

The information stored in the production captured data DB 12 further indicates that an SQL Req transmitted from the production AP server 1a to the production DB server 1b is thirdly captured; an SQL Res transmitted from the production DB server 1b to the production AP server 1a is fourthly captured; an IIOP Res transmitted from the production AP server 1a to the production web server 1e is fifthly captured; and an HTTP Res transmitted from the production web server 1e to the client terminal 1c is sixthly captured.

Figure 10:
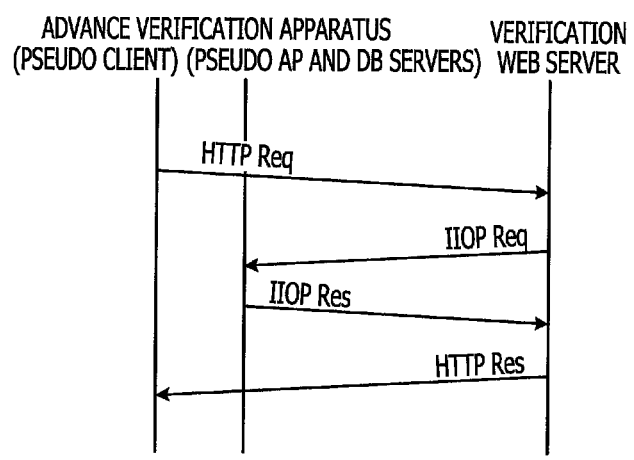
FIG. 10 is a diagram for explaining advance verification according to a third embodiment.

Next, an example in which the advance verification apparatus 10 including the aforementioned databases verifies the verification web server 2b will be discussed. FIG. 10 is a diagram for explaining advance verification according to the third embodiment. As illustrated in FIG. 10, when an HTTP Req transmitted from the client terminal 1c to the production web server 1e waits to be transmitted, the client pseudo operation unit 17a of the advance verification apparatus 10 references the production captured data DB 12. Then, the client pseudo operation unit 17a transmits the HTTP Req to the verification web server 2b on the basis of information with the sequential number "1" stored in the production captured data DB 12.

Subsequently, the server pseudo operation unit 17b receives an IIOP Req from the verification web server 2b as the same process as a process indicated by information with the sequential number "2" stored in the production captured data DB 12. Then, the server pseudo operation unit 17b transmits an IIOP Res to the verification web server 2b on the basis of information with the sequential number "5" stored in the production captured data DB 12.

In this case, the server pseudo operation unit 17b does not transmit a packet on the basis of each of information with the sequential numbers "3" and "4" stored in the production captured data DB 12. Specifically, the server pseudo operation unit 17b does not perform transmission and reception of an SQL Req corresponding to the SQL Req transmitted from the production AP server 1a to the production DB server 1b and does not perform transmission and reception of an SQL Res corresponding to the SQL Res transmitted from the production DB server 1b to the production AP server 1a. The server pseudo operation unit 17b supposes that processes that are not directly related to the verification web server 2b are performed implicitly in the server pseudo operation unit 17b similarly as in the production environment. Therefore, the server pseudo operation unit 17b does not transmit and receive packets on the basis of the information with the sequential numbers "3" and "4" stored in the production captured data DB 12.

When the server pseudo operation unit 17b receives an HTTP Res corresponding to the HTTP Res transmitted from the verification web server 2b to the client terminal 1c, the result analysis unit 17c analyzes and verifies a function and performance of the verification web server 2b in the verification environment, and the result analysis unit 17c displays results of the verification test. The process performed by the result analysis unit 17c is the same as the process performed in the second embodiment, and a detailed discussion thereof will be omitted.

Effects Obtained in Third Embodiment

In the third embodiment, the advance verification apparatus 10 may verify the verified apparatus without using captured data, which is stored in the production captured data DB 12, regarding communication related to an apparatus that is not to be verified and with which the verified apparatus does not directly communicate. The advance verification apparatus 10 may capture, in the production environment, packets used only for communication related to the verified apparatus and may not capture packets used for communication that is not related to the verified apparatus. In this case, it is possible to inhibit the capacities of memories and the capacities of databases from being increased.

Fourth Embodiment

In the examples in the first to third embodiments, the advance verification apparatus 10 uses data captured in the production environment and performs the advance verification. The advance verification is not limited to this. For example, the advance verification apparatus 10 may generate an association table regarding transmitted and received packets on the basis of data captured in the production environment and perform the advance verification using the generated association table. In a fourth embodiment, the generation of the association table by the advance verification apparatus 10 will be discussed below.

First Specific Example

Figure 11:
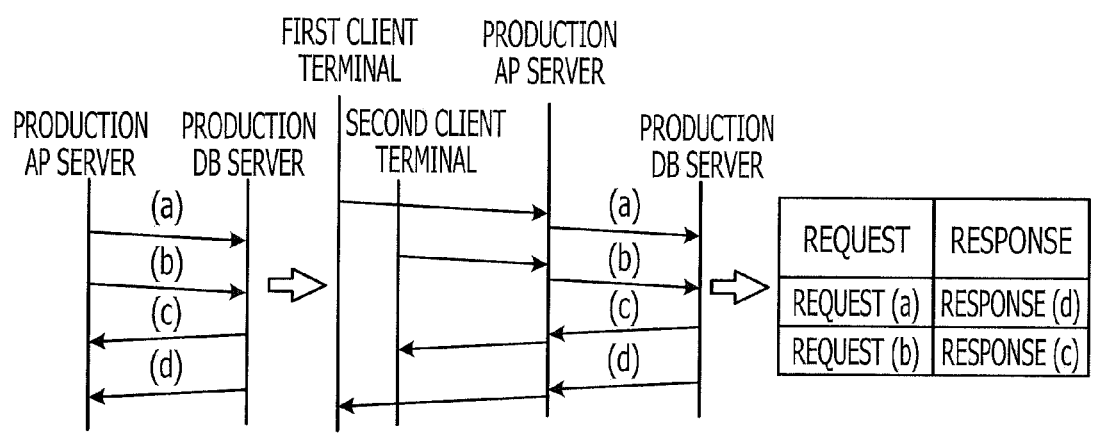
FIG. 11 is a diagram illustrating an example of a generation of an association table.

FIG. 11 is a diagram illustrating an example of the generation of the association table. As illustrated on the left of FIG. 11, the packet capture unit 16 of the advance verification apparatus 10 captures packets used for communication between the production AP server 1a and the production DB server 1b and thereby learns that a request (a), a request (b), a response (c) and a response (d) are transmitted and received between the production AP server 1a and the production DB server 1b. However, the packet capture unit 16 may not figure, only on the basis of the learned information, which response is transmitted in response to which request.

Thus, the packet capture unit 16 combines results of capturing packets used for communication between the production AP server 1a and the client terminal 1c with results of capturing the aforementioned packets used for communication between the production AP server 1a and the production DB server 1b. For example, the packet capture unit 16 arranges, in chronological order, data of captured packets used for communication between the production AP server 1a and each of client terminals and data of the captured packets used for communication between the production AP server 1a and the production DB server 1b. As illustrated in the center of FIG. 11, the packet capture unit 16 learns that the production AP server 1a receives a request from a first client terminal and transmits the request (a) to the production DB server 1b and that the production AP server 1a receives a request from a second client terminal and transmits the request (b) to the production DB server 1b. In addition, as illustrated in the center of FIG. 11, the packet capture unit 16 learns that the production AP server 1a receives the response (c) from the production DB server 1b and transmits a response to the second client terminal and that the production AP server 1a receives the response (d) from the production DB server 1b and transmits a response to the first client terminal.

As a result, the packet capture unit 16 stores the request (a) and the response (d) in association with each other and the request (b) and the response (c) in association with each other as a "request" and a "response" in the association table, as illustrated on the right of FIG. 11. Thereafter, the client pseudo operation unit 17a and the server pseudo operation unit 17b use the association table to perform the advance verification.

For example, when the production AP server 1a is to be verified by the advance verification apparatus 10, the client pseudo operation unit 17a performs the operation of the client terminal 1c in a pseudo manner so as to transmit the request to the verification AP server 2a. Then, when the server pseudo operation unit 17b receives the request (a) from the verification AP server 2a, the server pseudo operation unit 17b extracts the response (d) associated with the request (a) from the association table and performs the operation of the production DB server 1b in a pseudo manner so as to transmit the response (d) to the verification AP server 2a. Thereafter, the server pseudo operation unit 17b receives the response corresponding to the response (d) from the verification AP server 2a.

When the packets are properly transmitted and received between the verified apparatus and the advance verification apparatus 10 on the basis of the association table, the result analysis unit 17c determines that the verified apparatus normally operates. On the other hand, when at least one of the packets is not transmitted or received between the verified apparatus and the advance verification apparatus 10 on the basis of the association table, the result analysis unit 17c determines that the verified apparatus abnormally operates.

Second Specific Example

Figure 12:
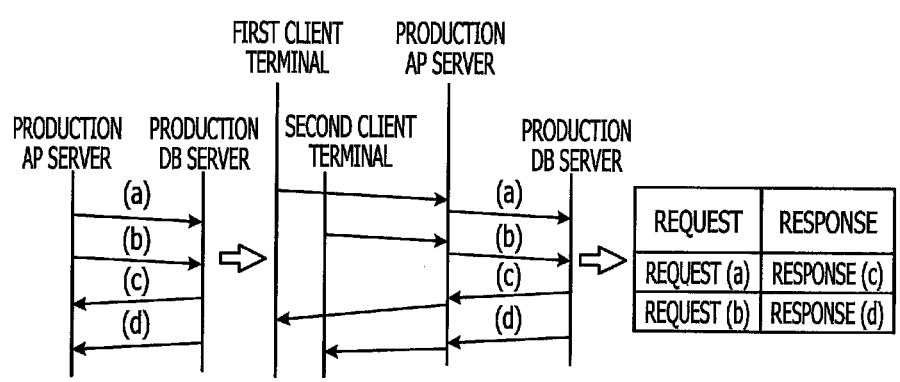
FIG. 12 is a diagram illustrating an example of a generation of an association table.

FIG. 12 is a diagram illustrating another example of the generation of the association table. As illustrated on the left of FIG. 12, the packet capture unit 16 of the advance verification apparatus 10 captures packets used for communication between the production AP server 1a and the production DB server 1b and thereby learns that a request (a), a request (b), a response (c) and a response (d) are transmitted and received between the production AP server 1a and the production DB server 1b. However, the packet capture unit 16 may not figure, only on the basis of the learned information, which response is transmitted in response to which request.

Thus, the packet capture unit 16 combines results of capturing packets used for communication between the production AP server 1a and the client terminal 1c with results of capturing the aforementioned packets used for communication between the production AP server 1a and the production DB server 1b. For example, the packet capture unit 16 arranges, in chronological order, data of captured packets used for communication between the production AP server 1a and each of the client terminals and data of the captured packets used for communication between the production AP server 1a and the production DB server 1b. As illustrated in the center of FIG. 12, the packet capture unit 16 learns that the production AP server 1a receives a request from a first client terminal and transmits the request (a) to the production DB server 1b and that the production AP server 1a receives a request from a second client terminal and transmits the request (b) to the production DB server 1b. In addition, as illustrated in the center of FIG. 12, the packet capture unit 16 learns that the production AP server 1a receives the response (c) from the production DB server 1b and transmits a response to the first client terminal and that the production AP server 1a receives the response (d) from the production DB server 1b and transmits a response to the second client terminal.

As a result, the packet capture unit 16 stores the request (a) and the response (c) in association with each other and the request (b) and the response (d) in association with each other as a "request" and a "response" in the association table, as illustrated on the right of FIG. 12. Thereafter, the client pseudo operation unit 17a and the server pseudo operation unit 17b use the association table to perform the advance verification.

Third Specific Example

Figure 13:
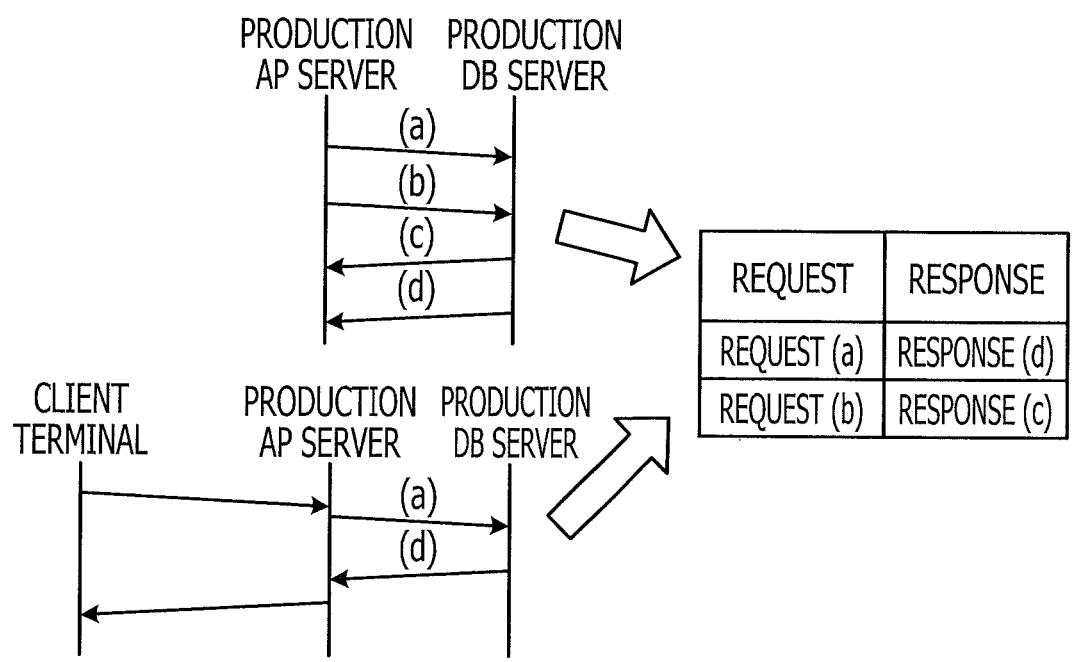
FIG. 13 is a diagram illustrating an example of a generation of an association table.

FIG. 13 is a diagram illustrating another example of the generation of the association table. As illustrated on the upper left of FIG. 13, the packet capture unit 16 of the advance verification apparatus 10 captures packets used for communication between the production AP server 1a and the production DB server 1b and thereby learns that a request (a), a request (b), a response (c) and a response (d) are transmitted and received between the production AP server 1a and the production DB server 1b. However, the packet capture unit 16 may not figure, only on the basis of the learned information, which response is transmitted in response to which request.

Thus, the packet capture unit 16 uses a single (non-multiple) sequence of processes performed among the client terminal 1c, the production AP server 1a and the production DB server 1b. The single sequence of processes refers to a sequence of processes, as illustrated on the lower left of FIG. 13, performed by apparatuses during a time period without performing a process included in another sequence performed by the apparatuses during the time period. Specifically, the packet capture unit 16 acquires, as information of captured packets different from information illustrated on the upper left of FIG. 13, information (illustrated on the lower left of FIG. 13) indicating that the production AP server 1a receives a request from the client terminal 1c and transmits the request (a) to the production DB server 1b. In addition, the packet capture unit 16 acquires information (illustrated on the lower left of FIG. 13) indicating that the production AP server is receives the response (d) from the production DB server 1b and transmits a response to the client terminal 1c.

Then, the packet capture unit 16 learns, on the basis of the information of the captured packets illustrated on the lower left of FIG. 13, that the request (a) corresponds to the response (d). The packet capture unit 16 compares the learned result with the information illustrated on the upper left of FIG. 13 and learns that the request (b) corresponds to the response (c) by excluding the request (a) and the response (d) from the information illustrated on the upper left of FIG. 13.

As a result, the packet capture unit 16 stores the request (a) and the response (d) in association with each other and the request (b) and the response (c) in association with each other as a "request" and a "response" in the association table illustrated on the right of FIG. 13. Thereafter, the client pseudo operation unit 17a and the server pseudo operation unit 17b use the association table to perform the advance verification.

Other Embodiments

Although several embodiments have been discussed above, various embodiments other than the aforementioned embodiments may be achieved. Hereinafter, the various embodiments other than the aforementioned embodiments will be discussed.

Verified Apparatus

In the examples in the aforementioned embodiments, the production AP server 1*a* or the production web server 1*e* is verified. However, the advance verification is not limited to this. The advance verification apparatus 10 may verify various apparatuses that operate in the production environment. The advance verification apparatus 10 may capture all packets that flow in the production environment. Alternatively, the advance verification apparatus 10 may capture only packets that are related to a verified apparatus.

In the examples in the aforementioned embodiments, the advance verification apparatus 10 receives a packet transmitted from the verified apparatus to other apparatuses that are not to be verified, and performs the operations of the other apparatuses in a pseudo manner. However, the pseudo operations are not limited to this. For example, the advance verification apparatus 10 may receive a packet transmitted from a verified apparatus to another verified apparatus by capturing packets in the production environment, and perform an operation of the other verified apparatus in a pseudo manner. In this case, for example, the advance verification apparatus 10 may receive a packet transmitted from the verified apparatus to the other verified apparatus by setting, in the verified apparatus, the IP address of the advance verification apparatus 10 as an address of the other verified apparatus with which the verified apparatus directly communicates.

Verification Environment

In the examples in the aforementioned embodiments, the production environment is configured with a network that is different from a network included in the verification environment. However, the environments are not limited to this. For example, the advance verification apparatus 10 may use the production environment to perform the advance verification. In this case, switching information which is set in the switch 1*d* illustrated in FIG. 1 may be changed so that the advance verification apparatus 10 and a verified apparatus are connected to each other. Alternatively, the networks may be temporarily changed so that the advance verification apparatus 10 and the verified apparatus are connected to each other in the production environment.

Communication Interface

In the example in the second embodiment, the IP address that is the same as the address of the production DB server 1*b* is assigned to the second port of the communication interface 11 of the advance verification apparatus 10 and the IP address that is the same as the address of the client terminal 1*c* is assigned to the third port of the communication interface 11 of the advance verification apparatus 10 so that communication between the verified apparatus and the production DB server 1*b* is distinguished from communication between the verified apparatus and the client terminal 1*c*. However, the communication interface 11 is not limited to this. For example, a plurality of communication interfaces may be included in the advance verification apparatus 10 and the communications may be distinguished from one another on the basis of characteristics of communication messages.

An example in which the communications are distinguished from one another on the basis of the characteristics of the communication messages will be discussed below. When HTTP communication is performed, the advance verification apparatus 10 may determine that the communication is performed with the client terminal 1*c*. When SQL communication is performed, the advance verification apparatus 10 may determine that the communication is performed with the production DB server 1*b*. The requests and the responses discussed in the aforementioned embodiments are examples. The requests and the responses are not limited to the aforementioned requests and responses.

System

Among the processes discussed in the aforementioned embodiments, all or a part of the processes discussed as performed automatically may be manually performed. In addition, among the processes discussed in the aforementioned embodiments, all or a part of the processes discussed as performed manually may be automatically performed by a known method. The process procedures, control procedures, specific names and information including the various types of data and parameters such as those illustrated in FIGS. 3, 9 and the like contained in the above discussion or illustrated in the accompanying drawings may be arbitrarily changed, unless otherwise noted.

The constituent elements of the apparatuses illustrated in the accompanying drawings are functionally conceptual and may not be physically arranged as illustrated in the accompanying drawings. The separations and integrations of the apparatuses are not limited to the separations and the integrations illustrated in the accompanying drawings. Specifically, all or a part of the apparatuses may be functionally or physically separated or integrated on an arbitrary basis in accordance with loads applied to the apparatuses and usage statuses of the apparatuses. In addition, all or an arbitrary part of the processing functions of each of the apparatuses may be achieved by a CPU of the apparatus and a program that is analyzed and executed by the CPU. Alternatively, all or an arbitrary part of the processing functions of each of the apparatuses may be achieved as hardware by a wired logic.

Program

Figure 14:
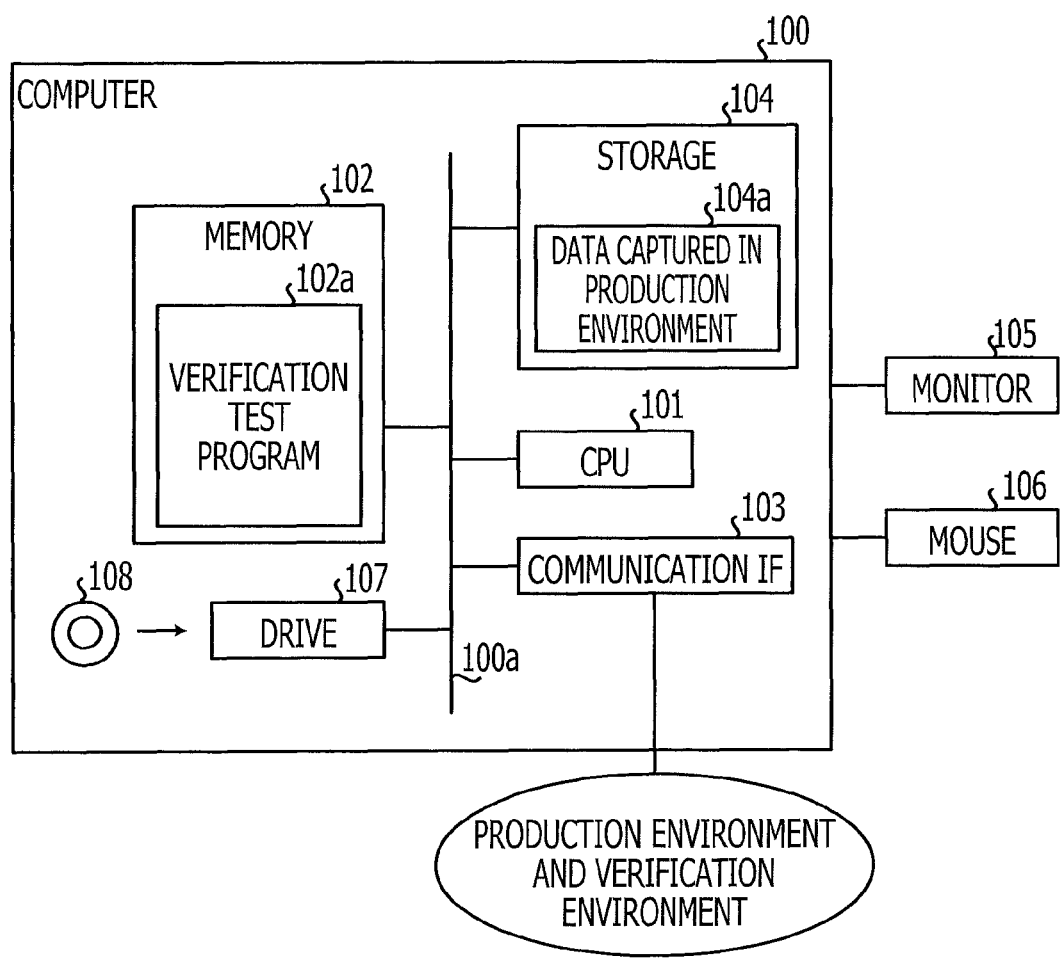
FIG. 14 is a diagram illustrating an example of a hardware configuration of a computer that executes a verification test program.

FIG. 14 is a diagram illustrating an example of a hardware configuration of a computer that executes a verification test program. As illustrated in FIG. 14, a computer 100 includes a CPU 101, a memory 102, a communication interface (IF) 103, a storage 104, and a drive 107 for reading data from and/or writing data to a computer-readable medium 108. These components are connected to one another through a bus 100*a*. The CPU 101 controls the entire computer 100. The memory 102 is used as a work area of the CPU 101. A verification test program 102*a* is loaded in the memory 102 and executed by the CPU 101. When the CPU 101 executes the verification test program 102*a*, a verification test process is performed in the same manner as the processes to be performed by the elements included in the control unit 15 illustrated in FIG. 2. In addition, data 104*a* captured in the production environment is stored in the storage 104. The program may be stored, when delivered, in the computer-readable medium 108 such as a compact disc (CD), a compact disc read-only memory (CD-ROM), CD recordable (CD-R), CD rewritable (CD-RW) or the like, a digital versatile disc (DVD), DVD-ROM, DVD-RAM, DVD-R, DVD plus R (DVD+R), DVD-RW, DVD plus RW (DVD+RW), HD DVD or the like, a Blu-ray disc, a magnetic disk, an optical disc, or a magneto-optical disc. The program is installed onto the storage 104 from the computer-readable medium 108, and loaded into the memory 102 from the storage 104 when executed by the CPU 101.

A monitor 105 is located outside the computer 100. A cursor, icons, a tool box, or data such as a document, an image, or information of functions is displayed on the monitor 105. The computer 100 is operated using a mouse 106. As the monitor 105, a cathode ray tube (CRT), a thin film transistor (TFT) liquid crystal display, a plasma display or the like may be used. The communication IF 103 is connected to networks such as a local area network (LAN), a wide area network (WAN) and the Internet through communication lines. The communication IF 103 is connected through the networks to other apparatuses such as the apparatuses included in the production environment and apparatuses included in the verification environment. In addition, the communication IF 103 is connected to the networks so as to function as an interface between the networks and inside, and control input of data to the computer 100 from an external apparatus and output of data from the computer 100 to the external apparatus. A LAN adapter or a modem may be used as the communication IF 103.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A verification apparatus for verifying a verified apparatus corresponding to a first apparatus included in a plurality of information processing apparatuses, the verification apparatus comprising:
    a first storage to store captured data acquired by capturing data transmitted and received among the plurality of information processing apparatuses;
    a second storage to store verification data; and
    a processor to perform the same process of a second apparatus included in the plurality of information processing apparatuses wherein the processor:
        receives first data transmitted from the verified apparatus, the first data being destined for the second apparatus,
        extracts, from the first storage, second data transmitted from the second apparatus in response to third data transmitted from the first apparatus to the second apparatus, the third data corresponding to the first data,
        transmits the extracted second data to the verified apparatus, and
        determines whether the captured data matches the verification data.

2. The verification apparatus according to claim 1, wherein the processor further transmits, to the verified apparatus, fourth data which has been transmitted to the first apparatus and has not been transmitted to the verified apparatus, the fourth data being stored in the storage.

3. The verification apparatus according to claim 1, wherein the processor further generates relation information regarding a relation between request data and response data transmitted in response to the request data, the request data and the response data being transmitted and received among the plurality of information processing apparatuses, and
    the processor extracts the second data transmitted in response to the third data corresponding to the first data on the basis of the generated relation information.

4. The verification apparatus according to claim 3, wherein the processor generates the relation information on the basis of captured data that has been captured during a time period in which a single sequence of processes related to the first apparatus is performed without performing a process included in another sequence of processes related to the first apparatus.

5. The verification apparatus according to claim 3, wherein the processor generates the relation information related to the first apparatus and the second apparatus on the basis of request data transmitted from a third apparatus included in the plurality of information processing apparatuses to one of the first apparatus and the second apparatus and response data received by the third apparatus from the one of the first apparatus and the second apparatus.

6. A verification method executed by a verification apparatus for verifying a verified apparatus corresponding to a first apparatus included in a plurality of information processing apparatuses, the verification method comprising:
    storing, in a first storage, captured data acquired by capturing data transmitted and received among the plurality of information processing apparatuses;
    storing, in a second storage, verification data; and
    performing, by a processor, the same process of a second apparatus included in the plurality of information processing apparatuses, the processor:
        receiving first data transmitted from the verified apparatus, the first data being destined for the second apparatus;
        extracting, from the first storage, second data transmitted from the second apparatus in response to third data transmitted from the first apparatus to the second apparatus, the third data corresponding to the first data;
        transmitting, by the verification apparatus, the extracted second data to the verified apparatus, and
        determining whether the captured data matches the verification data.

7. A computer-readable, non-transitory medium storing a program that causes a computer to execute a verification process for verifying a verified apparatus corresponding to a first apparatus included in a plurality of information processing apparatuses, the verification process comprising:
    storing, in a first storage, captured data acquired by capturing data transmitted and received among the plurality of information processing apparatuses;
    storing, in a second storage, verification data; and
    performing, by a processor, the same process of a second apparatus included in the plurality of information processing apparatuses, the processor:
        receiving first data transmitted from the verified apparatus, the first data being destined for the second apparatus;
        extracting, from the first storage, second data transmitted from the second apparatus in response to third data transmitted from the first apparatus to the second apparatus, the third data corresponding to the first data;
        transmitting the extracted second data to the verified apparatus, and
        determining whether the captured data matches the verification data.

* * * * *